Feb. 9, 1932. H. D. COLMAN 1,844,841
HEAT REGULATING SYSTEM
Filed May 8, 1929 2 Sheets-Sheet 1
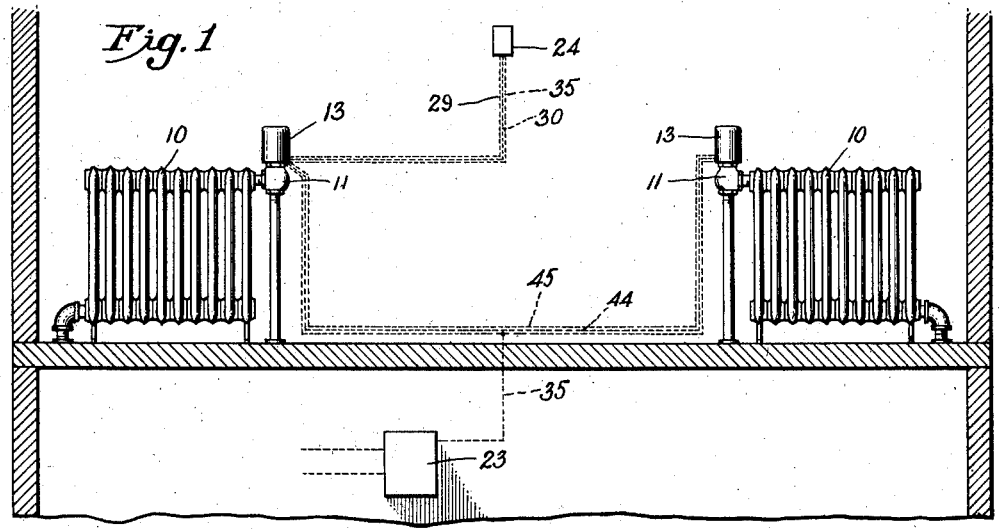
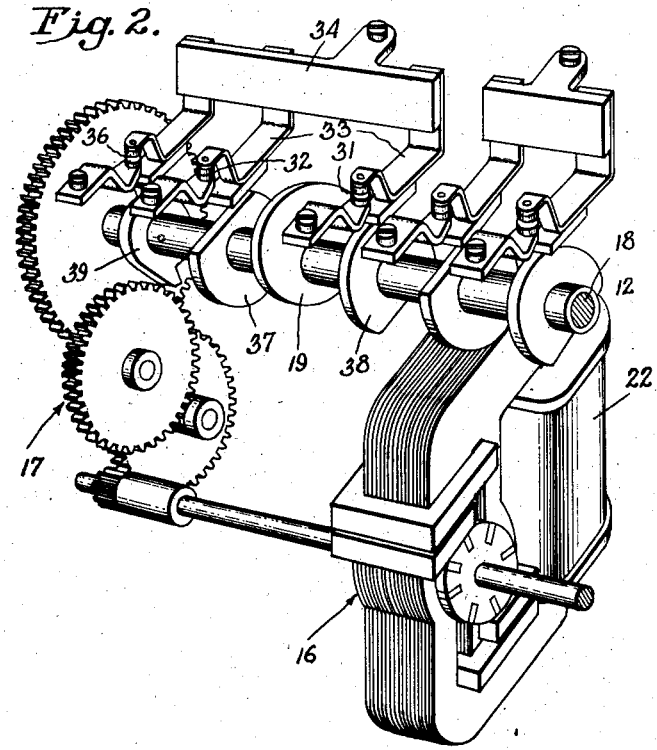
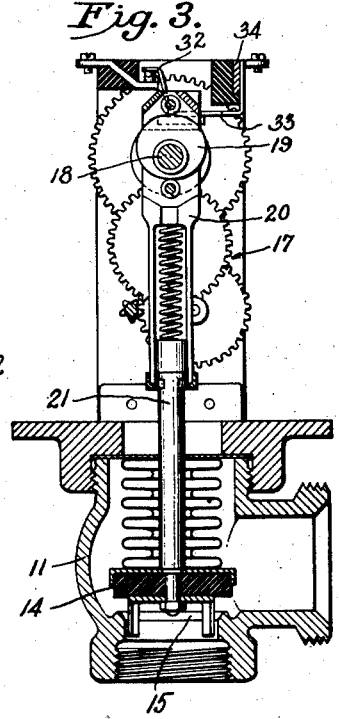
INVENTOR
Howard D. Colman
BY
ATTORNEYS

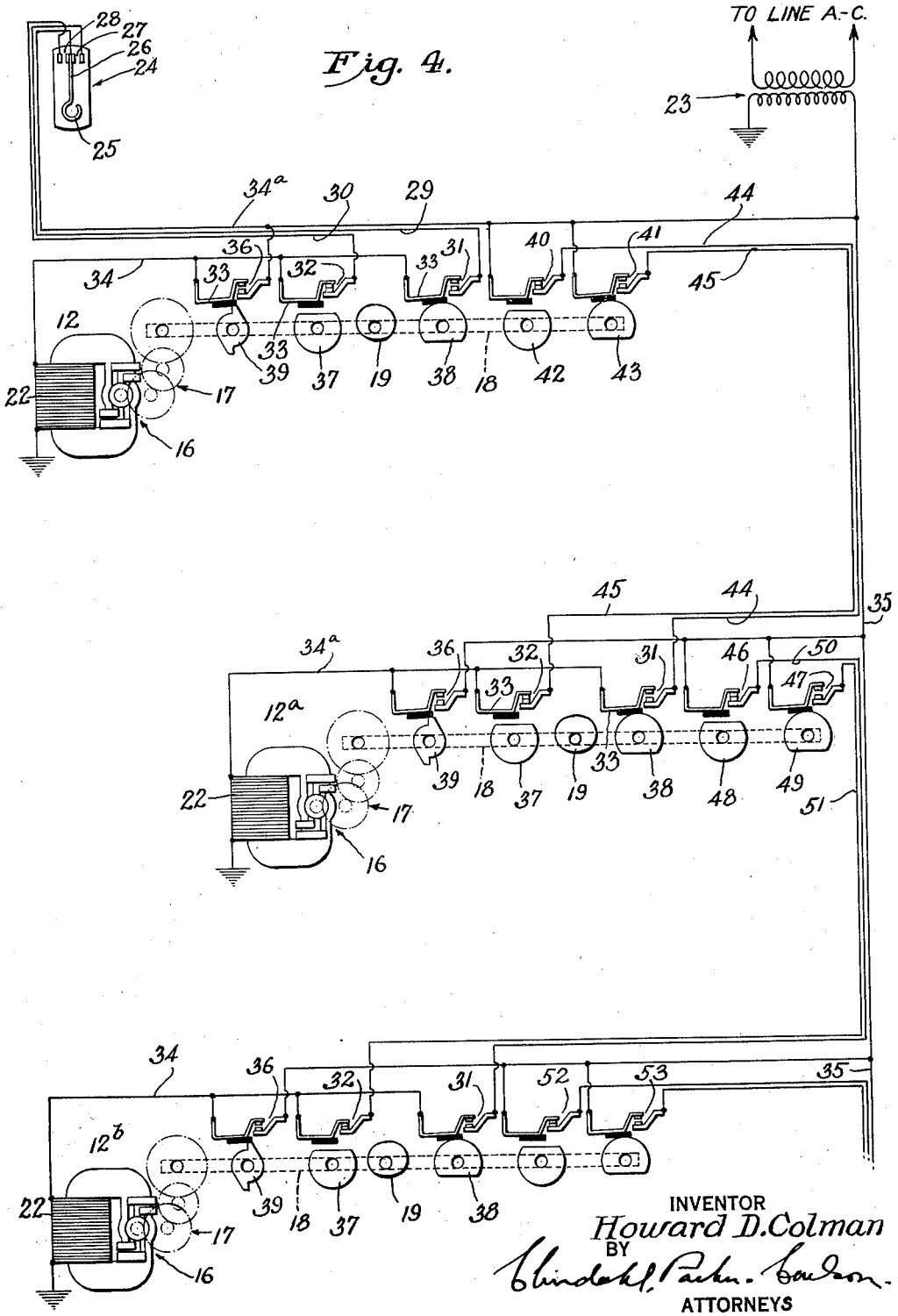

Patented Feb. 9, 1932

1,844,841

UNITED STATES PATENT OFFICE

HOWARD D. COLMAN, OF ROCKFORD, ILLINOIS

HEAT REGULATING SYSTEM

Application filed May 8, 1929. Serial No. 361,302.

This invention relates to improvements in heat regulating systems and more particularly to air heating systems which are controlled by thermostatic means responsive to the temperature of the air to be conditioned.

In air heating systems such as are now used in office buildings, apartments and the like, the radiators or other heat supplying means are commonly equipped with power operated regulating devices controlled by individual thermostats. Frequently more than one radiator is located in each room and in such a case it is desirable, in order to minimize installation and equipment costs that several operators be controlled from one thermostat. On the other hand, too great a burden would be placed on the more or less delicate thermostats preferably employed if more than one operator is controlled directly thereby.

The primary object of the present invention is to provide a new and improved control mechanism in a system of the above general character by which the power operators for a plurality of heat regulating devices may be controlled from a single control means such as a sensitive thermostat without placing undue burdens on the latter. This object is attained generally by placing the operator for one heat regulating device directly under the control of a thermostat and utilizing this operator as a pilot or relay mechanism for initiating the operation of the operator of a second control device.

Another object is to provide a plurality of electrically driven heat control devices so arranged that the operation of one device initiates automatically the operation of another so that only the current for one operator flows through the controlling thermostat, each device being adapted to terminate its own cycle of operation.

Other objects and advantages will become apparent from the following description taken in connection with the accompanying drawings, in which:

Figure 1 is a fragmentary view of a room equipped with a heat regulating system embodying the features of the present invention.

Fig. 2 is a perspective view of the operating parts of an actuator for one of the heat regulating devices.

Fig. 3 is a vertical sectional view of a valve and its operator which constitute a heat regulating device.

Fig. 4 is a schematic view and wiring diagram of the system.

While the invention is susceptible of various modifications and alternative constructions, I have shown in the drawings and will herein describe in detail the preferred embodiment, but it is to be understood that I do not thereby intend to limit the invention to the specific form disclosed but intend to cover all modifications and alternative constructions falling within the spirit and scope of the invention as expressed in the appended claims.

In the exemplary form shown in the drawings, the invention is embodied in a heating system of the direct radiation type wherein heat is supplied to different rooms from radiators 10 and the amount of such heat is controlled by the operation of regulating devices such, for example, as valves whose casings 11 are interposed in the radiator inlet pipes. Two radiators are provided for heating the room shown in Fig. 1 but it will be apparent that any number of these may be employed.

As a means for opening and closing the radiator valves to render the radiators operative or inoperative, a power operator, generally designated by the numeral 12, is associated with each valve. In the present instance, the operator is mounted directly upon the valve casing within a cap 13 and arranged to execute successive operating cycles to move a reciprocable valve member 14 toward and from its seat 15 within the valve casing. Each operator includes an electric motor 16 which, through the medium of speed reducing gears 17, drives a shaft 18 carrying an actuating cam 19. In successive half revolutions of the shaft 18, the cam 19 moves a follower 20 and the valve stem 21 connected thereto in opposite directions thereby opening and closing the valve passageway.

The motor herein shown is of the single-phase induction type having a winding 22 adapted to be energized from a source of alternating current such, for example, as the secondary of a transformer 23. One terminal of the transformer may be grounded to the piping of the system so that the latter may be used as a current conductor.

The operator for one of the radiator valves is controlled directly by a thermostat 24 responsive to the temperature of the air in the room where the radiators are located. Herein the thermostat comprises a thermo-sensitive element such as a bi-metallic strip 25 for actuating a tongue 26 to alternately close two control switches 27 and 28 when the room temperature rises above or falls below a point predetermined by the setting of the thermostat. The switches are formed by a contact on the tongue and two relatively stationary contacts cooperating therewith.

The switches 27 and 28 are interposed in separate parallel circuits leading through the motor winding 22 of one valve operator, and act to control the starting of the motor to define successive half revolutions of the shaft 18 during which the valve is alternately opened and closed. For this purpose, the stationary contacts of the switches 27 and 28 are connected by conductors 29 and 30 to the relatively stationary contacts of two starting switches 31 and 32 incorporated in the motor unit and normally tending to close by reason of the resiliency of strips 33 on which their movable contacts are mounted. The latter contacts are made electrically common and are connected by a conductor 34 to one end of the motor winding 22 which is grounded at its other end to the piping of the heating system, being thereby connected to one terminal of the transformer secondary. The thermostat tongue 26 is connected by means including a conductor 34$^a$ to one terminal of a running switch 36 whose other contact is common to the conductor 34. The conductor 34$^a$ leads to a main power line 35 which is connected to the non-grounded side of the transformer 23.

The starting switch 32 which cooperates with the thermostat switch 28 to control the valve-closing cycle, is allowed to close by a cam 37 prior to the completion of the valve-opening cycle of the motor operator, and is opened during the valve closing cycle after the running circuit through the switch 36 has taken control of the motor. A similar cam 38 controls the starting switch 31 which governs the valve-opening cycle. The running switch 36 is allowed to close by a cam 39 shortly after the initiation of each valve operating cycle thereby relieving the current burden on the thermostat switch which initiated the cycle. Each cycle is terminated by opening of the switch 36 when the valve member 13 reaches open or closed position.

With the present system, any number of valve operators may be controlled from a single sensitive thermostat without drawing additional current through the sensitive contact switches thereof. In Fig. 4, three operators designated 12, 12$^a$ and 12$^b$ are illustrated, the latter two being also equipped with control switches 31, 32 and 36 and controlling cams 37, 38 and 39 which operate to control the running circuit and the two starting circuits of the latter operators in the same manner as the corresponding switches and cams of the operator 12.

Mechanism is associated with the shaft 18 of the operator 12 which serves as a pilot or relay control for initiating valve operating cycles of the operator 12$^a$ corresponding to the cycles executed by the operator 12 and initiated by closure of one of the control switches 27 and 28 of the thermostat 24. This mechanism includes two auxiliary switches 40 and 41 constructed similar to the switches 31 and 32 and arranged to be operated by cams 42 and 43. The switch 40 is allowed to close in the latter part of the valve-opening cycle of the operator 12 and may be opened any time after the main or running switch 36 of the operator 12$^a$ has assumed control, this being, in the present instance, in the subsequent cycle of operation. Likewise, the switch 41 is allowed to close in the latter part of the valve-closing cycle and is opened early in the valve-opening cycle. By delaying closure of the switches 40 and 41 controlling the operator 12$^a$, until the latter part of the cycles of the operator 12, the two operators will run simultaneously for only a short interval and a third operator if controlled by the operator 12$^b$, would not be started until after the first operator has stopped. That is to say, the maximum current which will be drawn from the power source for the operators of one room will never exceed twice that required for one operator. In this way, a large number of operators may be driven from a low capacity transformer and wire conductors of uniformly small size may be used throughout an entire system.

The switches 40 and 41 perform the same functions as regards the operator 12$^a$ as the switches 27 and 28 of the thermostat do in initiating the operating cycles of the operator 12. Thus the switch 40 cooperates with the switch 31 of the operator 12$^a$ to initiate the valve-opening cycle and for this purpose its movable contact is connected to the power conductor 34$^a$ and its stationary contact is connected by a conductor 44 to the stationary contact of the starting switch 31 of the operator 12$^a$. In a similar way, the switch 41 has its contacts connected respectively to the power conductor 34$^a$ and the switch 32 of the operator 12ª, the latter being through the medium of a conductor 45.

Owing to the rugged character of the switches 40 and 41 which control the operator 12ª, it is not necessary to relieve the burden on them by the use of the running circuit controlled by the switch 36 of the operator 12ª. Thus, instead of the arrangement shown in Fig. 4, it is contemplated that the switch 36 and the cam 39 may be omitted in the operator 12ª and the cycles thereof terminated by the switches 31 and 32.

Where more than one auxiliary operator is controlled from a single thermostat, such operators may be started simultaneously under the control of the relay mechanism associated with the first operator or they may be started in succession. In the latter case, the second operator may be used as a relay mechanism for actuating switches to initiate the operating cycles of the third operator. Such an arrangement is shown in Fig. 4 wherein auxiliary switches 46 and 47 are controlled by cams 48 and 49 on the shaft 18 of the operator 12ª, in the same way as the switches 40 and 41 are controlled by the operator 12. The switches 46 and 47 have one terminal common to the power conductor 35 and their other terminals are connected respectively by conductors 50 and 51 to the starting switches 31 and 32 of the operator 12ᵇ. A fourth operator (not shown) may be controlled by auxiliary switches 52 and 53 operated by the operator 12ᵇ.

To summarize the operation of the mechanism above described, let it be assumed that the parts of the different operators are positioned as shown in Fig. 4 with all of the radiator valves open, and that the temperature in the room increases to such a point that the thermostat switch 28 will be closed. Closure of this switch establishes the starting circuit for the operator 12 through the then closed switch 32 whereupon the motor starts to rotate and move the valve stem in a direction to close the valve for its radiator. Shortly after the initiation of this valve-closing cycle, the cam 39 allows the switch 36 to close, thereby establishing the running circuit through the motor winding which relieves the burden on the thermostat switch. Then the switch 32 may be opened by its cam 37 without interrupting the operation of the motor. This cycle of the operator 12 is terminated when the valve has been seated, this being effected by opening of the switch 36 under the control of the cam 39.

During the half revolution of the shaft 18 thus executed, and preferably near the latter part of this movement, the switch 41 is allowed to close by its cam 43 which thereby completes the starting circuit through the then closed switch 32 of the operator 12ª. This starts the motor of the latter operator whereupon its running switch 36 is closed and takes control for the remainder of the valve-closing cycle. Near the end of this cycle the switch 47 is allowed to close and thereby initiate the valve-closing cycle of the operator 12ᵇ.

It will be noted that each cycle of the operators 12ª and 12ᵇ is initiated by closure of a control switch located remotely from such operator, while the cycles are terminated by the switches 36 which are incorporated in and operated by the operator with which they are associated. By thus controlling the termination of the cycles, the operators are adapted to execute cycles of equal length even though certain of the operators are started subsequent to the starting of the first operator.

In a similar manner, the three operators are operated in succession to execute valve-opening cycles in response to the closure of the thermostat switch 27 when the temperature of the room heated by the different radiators has been reduced below the predetermined point. In the execution of these cycles, the operator 12 is controlled directly by the closure of the thermostat switch 28, and the operator 12ª is started by closure of the switch 40 of the operator 12 while the latter is executing its valve-opening cycle.

It will be apparent that I have provided a simple and reliable arrangement for controlling a plurality of power operators for heat control devices, at the same time reducing to a minimum the intensity of the current which flows through the controlling thermostat contacts. In this environment a thermostat of relatively inexpensive construction will operate reliably for long periods of time.

The valve operator per se disclosed herein forms the subject matter of a co-pending application filed jointly by myself and Duncan J. Stewart on January 2, 1930, Serial No. 417,989.

I claim as my invention:

1. In an air heating system, the combination of a plurality of heat regulating devices, a plurality of power operators one for each of said devices including an electric motor, a source of electric current, means providing two energizing circuits through said source of current and the windings of each of said motors, each of said circuits having a control switch therein adapted when closed to initiate the operation of one of said operators, thermo-sensitive means operable to alternately close the control switches for one of said operators, and means operable in successive cycles of said last mentioned operator to alternately close the control switches for another of said operators.

2. In an air heating system, the combination of a plurality of heat regulating devices controlling the operation of a plurality of heat supplying means, a plurality of power operators one for each of said devices including an electric motor, a source of electric current, means providing two energizing circuits through said source of current and the windings of each of said motors, each of said circuits having a control switch therein adapted when closed to initiate the operation of the motor whereby to render the associated heat supplying means operative or inoperative, means responsive to the temperature of the heated air and operable to alternately close the control switches for one of said operators, means operable in successive cycles of said last mentioned operator to alternately close the control switches for another of said operators, and means associated with each operator and operable as an incident to the operation thereof to interrupt the energizing circuit through the winding of the associated motor whereby to terminate the cycle of operation thereof when the regulating device controlled by such motor has been moved to either of two positions.

3. In an air heating system, the combination of a plurality of heat regulating devices controlling the supply of heat to the air in a room to be heated, a plurality of power operators one for each of said devices including an electric motor, a source of electric current, means providing two energizing circuits through said source of current and the windings of each of said motors, said circuits being adapted to control different cycles of operation of the operator and each having two control switches therein one of said switches being disposed adjacent the motor controlled thereby, the other switch being located remotely from the motor, a thermo-responsive means operable to alternately close the remote control switches for one of said operators, the remote control switches for a second operator being closed alternately in successive cycles of said last mentioned operator, and means actuated by the individual operators for closing their adjacent switches in alternate cycles whereby to prepare the motor circuits for control in the succeeding cycle by one of the remote control switches.

4. In a heat regulating system, the combination of a plurality of valve devices controlling a plurality of heat supplying means in a room to be heated, a plurality of power operators one for each of said devices, a thermo-sensitive control mechanism responsive to the room temperature and arranged to initiate the operation of one of said operators in successive cycles of operation during which the valve device is alternately opened and closed, and means operable as an incident to the operation of said first mentioned operator to initiate a corresponding cycle of operation of another of said operators.

5. In a heat regulating system, the combination of a plurality of valve devices controlling the flow of heat from different heat supplying means, a plurality of power operators one for each of said devices, a thermo-sensitive control mechanism arranged to initiate the operation of one of said operators in successive cycles of operation during which the valve device is alternately opened and closed, means operable as an incident to the operation of said first mentioned operator to initiate a corresponding cycle of operation of another of said operators, and means associated with each of said operators for terminating the operating cycles thereof independently of the means for initiating such cycles.

6. In a heat regulating system, the combination of a plurality of valve devices controlling the flow of heat from different heat supplying means, a plurality of power operators one for each of said devices, a thermo-sensitive control mechanism arranged to initiate the operation of one of said operators in successive cycles of operation during which the valve device is alternately opened and closed, and means actuated by said operator in the latter part of each operating cycle thereof to initiate a corresponding cycle of operation of another of said operators.

7. In an air conditioning system, the combination of a plurality of air conditioning devices, means associated with each device for controlling the operation thereof including a power driven operator, means responsive to changes in the condition of the air to initiate the operation of one of said operators, and a pilot mechanism controlled by said last mentioned operator and constituting the sole means for initiating the operation of another of said operators.

8. In a heat regulating system, the combination of a plurality of heating radiators in a room to be heated, means associated with each radiator controlling the radiation of heat therefrom including a power driven operator, thermo-sensitive means responsive to the temperature of the air in said room and operable to initiate the operation of the operator for one of said radiators, means actuated by the last mentioned operator and operable near the end of each cycle thereof to initiate a corresponding cycle of another of said operators whereby to relieve the burden on said thermo-sensitive means, and means incorporated in each operator for terminating the cycles of operation thereof.

9. In a heating system, the combination of a plurality of heat supplying means in a room to be heated, a thermostat responsive to the room temperature, a plurality of individual heat regulating devices for said heat supplying means, each having an electro-magnetic power operator, one of said operators only being conrolled directly by said thermostat to render its supplying means operative or inoperative, and switch mechanism actuated by said last mentioned operator to initiate the operation of another of said operators whereby to render a second one of said supplying means operative or inoperative without increasing the intensity of the current flowing through the thermostat.

10. In an air conditioning system, the combination of a plurality of conditioning devices in a room the air in which is to be treated, individual power operators for said devices, each including an electric driving motor, a control device for initiating the operation of one of said operators said device being responsive to the condition of the air being treated, and means actuated as an incident to the operation of said last mentioned motor to start the motor of a second one of said operators without increasing the current flow through said control device.

11. In a heating system, the combination of a plurality of heat supplying devices, a plurality of power operators one for each of said devices including an electric motor and a rotary element driven thereby and having two rest positions in one of which the associated device is operative to supply heat and in the second of which the device is inoperative, means controlling one of said operators to initiate operation of the motor to move the element driven thereby to said first position in response to a decrease in temperature below a predetermined value and to said second position in response to a temperature increase above such value, and means actuated independently of said thermo-responsive means and under the control of the rotary element of said thermostatically controlled operator to initiate corresponding operating cycles of the motor for a second one of said operators whereby to cause the rotary element of the second operator to be moved into a position corresponding to that of the element of the first operator.

12. In a heating system, the combination of a plurality of devices controlling the flow of heating medium, a power operator for actuating one of said devices to turn said supply on and off, a power operator for actuating a second one of said devices to turn the supply of heating medium either on or off and constituting a relay for initiating corresponding cycles of said first mentioned operator automatically as an incident to its own movements, and independently operable means for initiating successive cycles of operation of said second operator.

13. In a heat regulating system, the combination of a plurality of power operators controlling the flow of heating medium, means for initiating successive cycles of operation of one of said operators to interrupt or resume the flow of the medium, relay means actuated by said last mentioned operator to initiate corresponding operating cycles of a second one of said operators, a second relay means actuated by said second operator to initiate corresponding cycles of a third of said operators, said relay means acting to initiate the cycle of the controlled operator in the last part of the cycle of the controlling operator whereby only two of the operators will be in operation simultaneously.

14. In a heat regulating system, the combination of a plurality of power operators controlling the flow of heating medium, means for initiating successive cycles of operation of one of said operators to interrupt or resume the flow of the medium, means actuated from said first mentioned operator for initiating corresponding operating cycles of another of said operators, and means rendered operative upon starting of said second operator to prolong its operation beyond the cycle of the controlling operator and to terminate its cycle after execution of a movement corresponding to that of the controlling operator.

In testimony whereof, I have hereunto affixed my signature.

HOWARD D. COLMAN.